United States Patent [19]
Miller

[11] Patent Number: 6,123,367
[45] Date of Patent: Sep. 26, 2000

[54] DRAINAGE SYSTEM FOR VEHICLE HOLDING TANKS

[76] Inventor: Valdon V. Miller, P.O. Box 574, Crescent City, Calif. 95531

[21] Appl. No.: 09/364,995

[22] Filed: Aug. 2, 1999

[51] Int. Cl.[7] .................................................. F16L 43/00
[52] U.S. Cl. .................. 285/181; 285/145.1; 285/145.2; 285/302; 285/376; 285/81; 137/899
[58] Field of Search .............................. 285/181, 145.1, 285/145.2, 903, 302, 81, 145.3, 145.4, 145.5, 376, 360; 137/899; 138/206

[56] References Cited

U.S. PATENT DOCUMENTS

| | | | |
|---|---|---|---|
| 381,008 | 4/1888 | Gould | 285/145.2 |
| 2,915,081 | 12/1959 | Warren | 137/899 |
| 3,496,959 | 2/1970 | Wolfe | 137/344 |
| 3,730,228 | 5/1973 | Gibbs, Sr. | 138/106 |
| 3,811,462 | 5/1974 | Feliz | 285/145.1 |
| 4,133,347 | 1/1979 | Mercer | 285/423 |
| 4,223,702 | 9/1980 | Cook | 138/106 |
| 4,650,224 | 3/1987 | Smith | 285/165 |
| 4,779,650 | 10/1988 | Sargent et al. | 137/899 |
| 4,844,121 | 7/1989 | Duke | 137/615 |
| 5,323,813 | 6/1994 | Barrett | 137/899 |
| 5,653,262 | 8/1997 | Hanemaayer | 137/899 |
| 5,904,183 | 5/1999 | Leech | 138/110 |
| 5,947,156 | 9/1999 | Tomczyk | 137/899 |

*Primary Examiner*—Eric K. Nicholson
*Attorney, Agent, or Firm*—James D. Givnan, Jr.

[57] ABSTRACT

A drainage system for emptying a holding tank of a vehicle includes upright telescopic members for attachment to the vehicle outlet. Ninety degree elbows are joined in a swiveled manner and are carried by the upright tubular members and are in communication with inclined telescopic tubular members terminating in communication with the inlet of a sanitary waste system. Couplings of the present system include bayonet inlets having multiple O-rings in place thereon for sealing engagement with a bayonet outlet. The upright telescopic tubular members permit positioning of the inclined tubular members at an incline to ensure optimal drainage. Additionally the upright tubular members permit the inclined tubular members to be swung about an upright axis to facilitate attachment to a sanitary system inlet. A modified form of the system includes an elbow equipped with a bayonet inlet with multiple O-rings for coupling with the vehicle horizontal outlet. A chevron seal prevents leakage between the inclined telescopic tubular members. A lock is insertable in a bayonet inlet to prevent rotation of joined inlet and outlet.

15 Claims, 2 Drawing Sheets

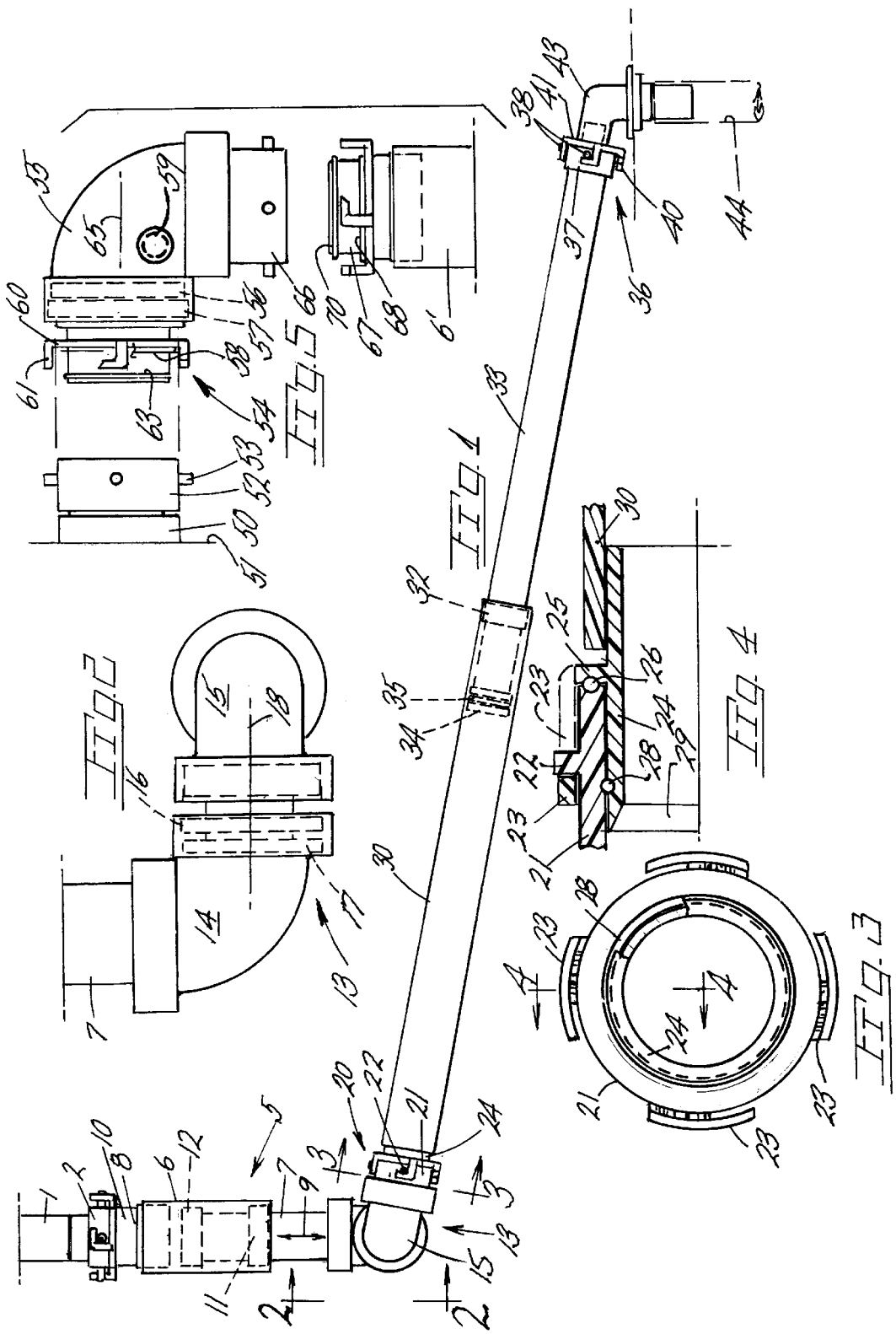

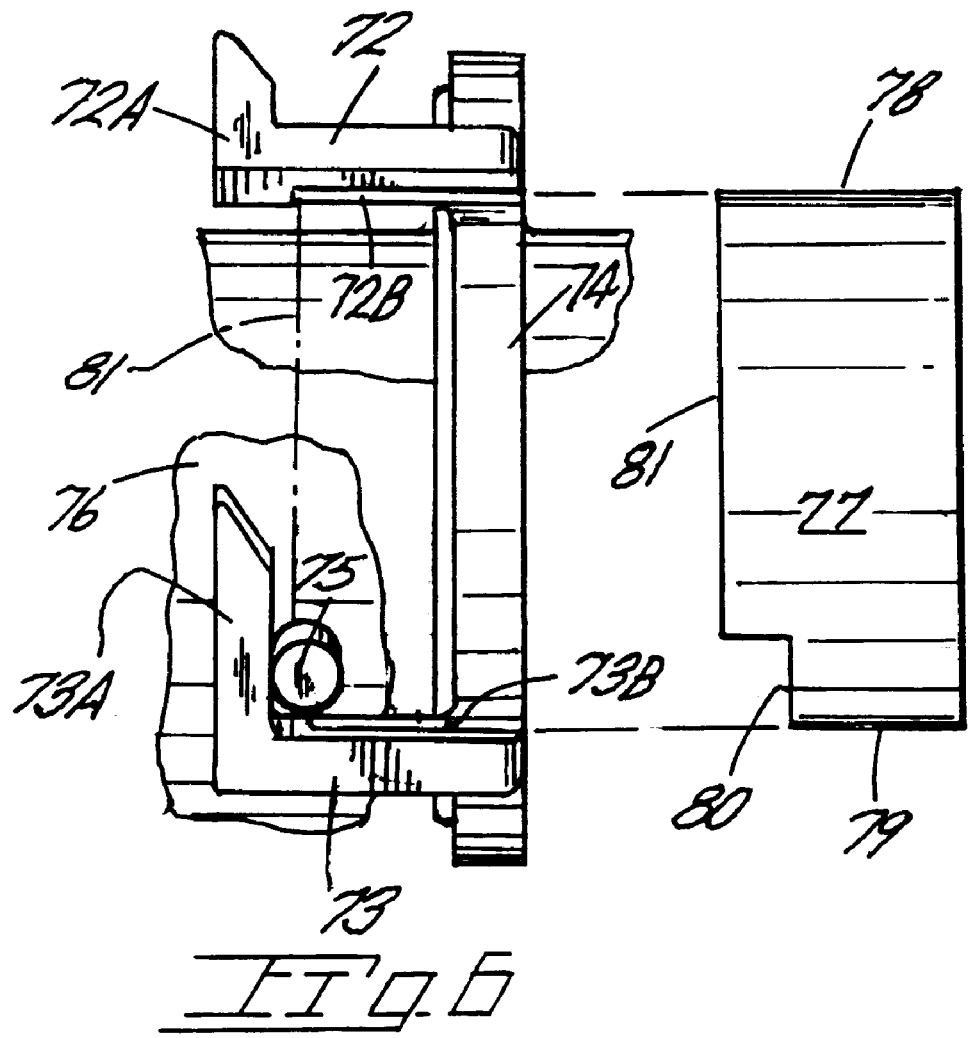

DRAINAGE SYSTEM FOR VEHICLE HOLDING TANKS

BACKGROUND OF THE INVENTION

The present invention pertains generally to drainage systems for emptying vehicle holding tanks at a stationary dump station.

Holding tanks are commonly provided on vehicles including motor homes and trailers and require periodic emptying into a stationary sanitary system termed a dump station. Well known in the present field of invention are lengths of flexible tubing with a corrugated wall which are provided with couplings at their opposite ends for connection to the vehicle drain and to a sanitary system. The use of such conduits incurs a cleaning problem in that such conduits do not lend themselves to thorough cleaning and frequently matter left therein will result in an unpleasant odor in the vehicle upon stowage of the conduit. Further, the cleaning task is objectionable in that it is normally accomplished using a garden hose for flusing into a suitable receptacle. At the end of a flushing operation, the flexible tubing must be drained and stowed aboard the vehicle, frequently a messy task.

Attempts have been made to utilize rigid conduits in such drainage systems but for one reason or another the same are not apparently in wide use. A drawback to rigid conduits is the lack of adequately sealing same resulting in discharge of fluid waste between the vehicle drain and the sanitary system inlet.

Further contributing to the task of draining a vehicle holding tank is the task of positioning of a vehicle so as to properly locate its drain relative the sanitary system and which may entail repeated efforts. As vehicles equipped with holding tanks are sizeable, the precise positioning of the vehicle with respect to a sanitary system inlet can require considerable effort.

In the prior art U.S. Pat. No. 3,496,959 discloses telescopic tubes of rigid construction served at their inlet and outlet ends by flexible hoses. Use entails the installation of the hoses with clamps at several points and the support of the telescopic tubes by temporary engagement with a bracket 26 supporting the tubes in an inclined manner. The tubes are supported by a bracket externally of the vehicle during travel which is impractical for current recreational vehicles in view of restricted ground clearance.

U.S. Pat. No. 3,730,228 shows telescopic tubing supporting a flexible hose therein to prevent sagging of the latter and does not contribute toward the solution of other problems encountered when such are used.

U.S. Pat. No. 4,650,224 discloses telescopic tubes in a drain system wherein corrugated tubing is utilized to couple the tubing to a vehicle drain outlet. O-rings are utilized for sealing the ends of telescoped tubular members which are provided with bayonet type couplings.

U.S. Pat. No. 4,223,702 utilizes telescopic tubes to impart rigidity to a flexible drainage hose extending therethrough.

U.S. Pat. No. 5,323,813 discloses telescopic tubing and utilizes flexible or corrugated wall tubing at both inlet and outlet ends which hinders proper flushing of the tubing after use.

SUMMARY OF THE PRESENT INVENTION

The present invention is embodied within a drainage system for vehicles having holding tanks which greatly alleviates the unpleasant task of emptying a vehicle holding tank by preventing seepage and facilitating cleaning after use.

The present system is adapted for use with both vertical and horizontally disposed vehicle outlets and includes upright tubular members which may be lengthwise adjusted to provide optimum inclination of downstream tubular components. Bayonet type connectors preferably include multiple seals. A swivel joint on the tubular members is positionable about and along an upright axis for precise positioning of the members toward the sanitary system inlet. Additionally, an outlet member of the swivel coupling is positionable about a generally horizontal axis enabling the telescopic members to be inclined to the extent desired. Limit stops within the tubular members prevent inadvertent separation of same while the telescoped end of one of said members is provided with a chevron type seal positionable along an internal wall surface. A lock is provided for bayonet type couplings to prevent all but intentional uncoupling efforts.

Important objectives of the present invention include the provision of a drainage system for discharging holding tank contents from a vehicle to a sanitary system inlet and which is operable through a wide range of positions to ensure completing hookup of the system without repeated positioning of the vehicle; the provision of a drainage system in which tubular members may be positioned to ensure optimal flow of holding tank contents; the provision of a drainage system utilizing couplings having multiple seals to avoid leakage of waste fluids; the provision of a vehicle drainage system for use with those vehicles having vertical system outlets as well as those vehicles having horizontally disposed outlets.

BRIEF DESCRIPTION OF THE DRAWINGS

In the accompanying drawings:

FIG. 1 is an elevational view of the present vehicle drainage system;

FIG. 2 is an elevational view taken along line 2—2 of FIG. 1;

FIG. 3 is a vertical sectional view taken along line 3—3 of FIG. 1 disclosing coupling details;

FIG. 4 is a vertical sectional view taken along line 4—4 of FIG. 3;

FIG. 5 is an elevational fragmentary view of a modified vehicle drainage system or communication with a horizontal vehicle outlet;

FIG. 6 is a fragmentary view of a bayonet coupling with a lock exploded away from the fragment.

DETAILED DESCRIPTION OF THE PREFERRED EMBODIMENTS

With continuing attention to the drawings wherein reference numerals indicate parts similarly hereinafter identified, the reference numeral 1 indicates the end segment of a vehicle outlet or drain through which a holding tank is emptied. The reference numeral 2 indicates an outlet coupling member typically mounted on the outlet end for coupling the drain to a conduit or conduits through which waste water and matter are discharged.

With attention now to the present drainage system, the reference numeral 5 indicates generally upper and lower telescopically adjustable tubular members 6 and 7 with the upper member receiving a sleeve 8 in which is secured a bayonet type inlet 10 preferably double sealed as later described. Lower telescopic pipe 7 projects upwardly through a collar 11 fixed in place in pipe 6 while a limit stop at 12 prevents separation of tube components. Accordingly, tubular member 7 may move vertically along an upright axis 9 as well as about the axis to provide, respectively, desired inclination of following described telescopic tubular members as well as to enable swinging of said members about upright axis 9 for directing said members toward a sanitary system inlet.

A swivel joint is indicated generally at 13 and, as shown in FIG. 2, includes 90 degree elbows 14 and 15 with the former secured to upright telescopic member 7. A stop 16 is secured within the outlet end of elbow 14 to confine a collar 17 in place while permitting rotational movement of elbow 15 about a horizontal axis at 18. A double sealed coupling generally at 20 includes a bayonet outlet component 21 carried within outlet elbow 15 of swivel joint 13 and which includes post or studs 22 spaced thereabout engageable with bayonet arms 23 of an inlet 24. As shown in FIG. 4, each bayonet arm 23 terminates in a hook end and, oppositely, in a radially extending flange 25 recessed to carry an O-ring 26. A second O-ring 28 is carried by bayonet inlet fitting 24 and occupies a circumferential groove extending about the inlet coupling for snug engagement with the interior of outlet component 21. Accordingly, O-rings 26 and 28 seal component 21 of the bayonet outlet in two places with bayonet inlet fitting 24. Fitting 24 is beveled at 29 to reduce flow obstruction.

With attention to the two main or inclined telescopically adjustable tubular members of the present system, a first member at 30 carries bayonet inlet fitting 24 at its inlet end while at its opposite or outlet end a limit stop 32 is provided which is embodied in a fixedly mounted ring. A second tubular member 33 has an upstream or inlet end fitted with a sleeve 34 in which is carried a chevron type seal 35. Stop 32 additionally serves to stabilize tubular member 33 against radial displacement relative tubular member 30 which would jeopardize the sealing function of seal 35 which is preferably of the chevron type. The lower or outlet end of tubular member 33 is provided with a double sealed coupling generally at 36 of the type above described with an outlet 37 having posts 38. For locked engagement with post 38 are arms 40 of a bayonet inlet 41 secured in place within an inlet fitting 43 serving a sanitary stationary drain conduit 44.

With attention to FIG. 5, the present drainage system is readily adaptable to use with those vehicles having a horizontally disposed outlet as at 50 which protrudes slightly from a vehicle outer wall 51. A bayonet equipped outlet is indicated at 52 having posts or studs 53 spaced thereabout. A double seal bayonet equipped inlet is indicated generally at 54 secured in place within a 90 degree elbow 55. The double seal bayonet inlet includes a ring 56 confined within the elbow end by a retainer 57. An O-ring 58 is seated in an annular flange 60 of inlet 54 equipped with arms 61 each terminating in a hook. A second O-ring at 63 seals against the inner wall of outlet 52. From this it will be seen that the double sealed bayonet inlet; may be securely attached to outlet 52 with the end thereof in sealing engagement with O-ring 58. Elbow 55 and ring 56 are positionable about a horizontal axis 65. A bayonet outlet 66 is carried by the remaining or lower end of elbow 55 to receive a bayonet inlet at 67. An O-ring 68 is carried within an annular groove in the bayonet inlet while a second O-ring 70 is carried within a circumferential groove adjacent the end of the inlet. An upright telescopically tubular member at 6' serves to receive a lower telescopically tubular member similar to the arrangement shown in FIG. 1 in the first described form of the invention. A clean out opening is normally closed by a cap 59.

In use, the present system is installed subsequent to positioning of the vehicle adjacent the sanitary system inlet 43. Bayonet inlet 10 is engaged with bayonet outlet 2 to secure the telescopic tubular members 6 and 7 in place with swivel joint 13 in place on lower telescopic member 7. Upright telescopic tubular member 7 is extended to the desired position and is maintained thereat by reason of member 7 being in a sliding frictional fit with stop 11. Inclined telescopically adjustable tubular members 30 and 33 are in a retracted state to permit convenient installation of member 30 and bayonet inlet 24 at its inlet end on bayonet outlet 21 carried by the swivel joint 13. Tubular members 30 and 33 may thereafter be positioned about axis 9 to locate end mounted bayonet outlet 37 for rotational engagement with bayonet inlet 41. For cleaning, the bayonet inlet 10 is detached from vehicle outlet 1 separating the drainage system from the vehicle outlet to permit a flow of fresh water from a hose to be discharged into the system which will remove virtually all waste matter from the system members. Storage of the cleaned components is facilitated by separation of the drainage system at bayonet inlet 24 and collapsing of all axially adjustable components into their companion tubular member.

In FIG. 6, a fragmentary view of a bayonet inlet shows adjacent bayonet arms 72–73 thereon which project from an annular flange 74. Each arm terminates at its distal end in a hook at 72A–73A for rotated engagement with posts 75 of a bayonet outlet at 76. Each arm shown is grooved lengthwise at 72B–73B to provide opposed groves for insertion of a lock 77 formed on the radius of flange 74 to enable insertion of lock ends 78–79 in a snug manner. A recess 80 in the lock receives a post 75. In place, the lock 77 prevents relative rotational displacement of the inlet and outlet. Lock removal is by the application of force on edge 81 of the lock.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A drainage system for discharging waste from a parked vehicle via an outlet on the vehicle to the inlet of a sanitary system, said system including, vertical telescopically adjustable tubular members, coupling means for attachment of one of said members to an outlet on the vehicle, a swivel joint including pipe elbows in joined swiveled engagement and in receiving communication with said tubular members, one of said elbows positionable about a horizontal axis, inclined telescopically adjustable tubular members in receiving communication with said swivel joint, and an outlet carried by one of said inclined telescopic members for engagement with the inlet of the sanitary system.

2. The system claimed in claim 1 wherein said coupling means includes an inlet elbow for temporary attachment to and communication with a horizontally disposed outlet on an exterior wall of the vehicle having a horizontal axis.

3. The system claimed in claim 2 wherein said inlet elbow is positionable about the horizontal axis.

4. The system claimed in claim 1 wherein one of said vertical telescopically adjustable tubular members is rotatably positionable about a major axis of said members.

5. The drainage system claimed in claim 1 additionally including bayonet couplings at an upper end and a lower end of said inclined telescopically adjustable tubular members.

6. The drainage system claimed in claim 4 additionally including a bayonet coupling on one of said vertical telescopically adjustable members for joining the vehicle outlet to said one of said vertical telescopically adjustable tubular members.

7. The drainage system claimed in claim 5 wherein each of said bayonet couplings includes multiple elastomeric seals.

8. The drainage system claimed in claim 6 wherein said bayonet coupling includes multiple elastomeric seals.

9. The drainage system claimed in claim 1 wherein said swivel joint includes 90 degree elbows, said 90 degree elbows and said vertical telescopically adjustable members positionable about a major axis of said vertical telescopically adjustable tubular members.

10. The drainage system claimed in claim 9 wherein one of said 90 degree elbows is positionable about a horizontal axis relative a remaining 90 degree elbow of the swivel joint to enable varying the inclination of said inclined telescopically adjustable tubular members.

11. The drainage system claimed in claim 1 wherein one of said inclined telescopically adjustable tubular members includes an inlet end, a seal in place about said inlet end.

12. The drainage system claimed in claim 1 additionally including bayonet type inlet and outlet connector assemblies for connecting respectively the vehicle outlet with said vertical telescopically adjustable tubular members, the swivel joint with said inclined telescopically adjustable tubular members, the inclined telescopically adjustable tubular members with said outlet, said connector assemblies each including multiple elastomeric seals.

13. A drainage system for discharging waste from a holding tank outlet of a vehicle into the inlet of a sanitary system, said system including, vertical telescopically adjustable tubular members for attachment to the vehicle outlet, a swivel joint including pipe elbows in receiving communication with said vertical adjustable telescopic tubular members, one of said elbows positionable about a horizontal axis, inclined telescopically adjustable tubular members in receiving communication with said swivel joint, an outlet for coupling said inclined telescopically adustable tubular members to the sanitary system.

14. The drainage system claimed in claim 13 additionally including a first bayonet coupling attaching the inclined telescopically adjustable tubular members to said swivel joint, a second bayonet coupling attaching said inclined telescopically adjustable tubular members to the inlet of the sanitary system, said first and second bayonet couplings each including multiple elastomeric seals.

15. The drainage system claimed in claim 5 wherein said bayonet couplings include respectively rotatably engageable arms and posts, a lock insertable between an arm on one of said bayonet couplings and a post on another of said bayonet couplings preventing rotational movement therebetween.

\* \* \* \* \*